(12) United States Patent  
Aizenberg et al.

(10) Patent No.: US 10,146,007 B2  
(45) Date of Patent: Dec. 4, 2018

(54) BAND-GAP TUNABLE ELASTIC OPTICAL MULTILAYER FIBERS

(71) Applicants: President and Fellows of Harvard College, Cambridge, MA (US); University of Exeter, Exeter, Devon (GB)

(72) Inventors: Joanna Aizenberg, Boston, MA (US); Mathias Kolle, Somerville, MA (US); Peter Vukusic, Exeter (GB); Robert D. Howe, Cambridge, MA (US)

(73) Assignees: President and Fellows of Harvard College, Cambridge, MA (US); University of Exeter, Exeter (GB)

( * ) Notice: Subject to any disclaimer, the term of this patent is extended or adjusted under 35 U.S.C. 154(b) by 0 days.

(21) Appl. No.: 14/760,306

(22) PCT Filed: Jan. 23, 2014

(86) PCT No.: PCT/US2014/012807  
§ 371 (c)(1),  
(2) Date: Jul. 10, 2015

(87) PCT Pub. No.: WO2014/116869  
PCT Pub. Date: Jul. 31, 2014

(65) Prior Publication Data  
US 2015/0362669 A1 Dec. 17, 2015

Related U.S. Application Data

(60) Provisional application No. 61/755,681, filed on Jan. 23, 2013.

(51) Int. Cl.  
*G02B 6/00* (2006.01)  
*G02B 6/02* (2006.01)  
(Continued)

(52) U.S. Cl.  
CPC .......... *G02B 6/0239* (2013.01); *G01L 1/242* (2013.01); *G01L 1/247* (2013.01); *G02B 1/005* (2013.01);  
(Continued)

(58) Field of Classification Search  
CPC .............. G02B 6/0239; G02B 6/02033; G02B 6/02038; G02B 6/023; G02B 6/02304;  
(Continued)

(56) References Cited

U.S. PATENT DOCUMENTS

2003/0031443 A1* 2/2003 Soljacic .......... B29D 11/00721  
385/125  
2004/0223715 A1* 11/2004 Benoit .................. C03C 25/106  
385/123  
(Continued)

FOREIGN PATENT DOCUMENTS

WO WO-2005101073 A1 10/2005  
WO WO-2010/017648 A1 2/2010  
WO WO 2010017648 A1 * 2/2010 ............. B82Y 20/00

OTHER PUBLICATIONS

Aizenberg, J., et al., "Skeleton of *Euplectella* sp.: Structural Hierarchy from the Nanoscale to the Macroscale," Science, vol. 309, No. 5732, pp. 275-278, 5 pages (Jul. 8, 2005).  
(Continued)

*Primary Examiner* — Jerry Blevins  
(74) *Attorney, Agent, or Firm* — Wilmer Cutler Pickering Hale and Dorr LLP (57) ABSTRACT

The rolled photonic fibers presents two codependent, technologically exploitable features for light and color manipulation: regularity on the nanoscale that is superposed with microscale cylindrical symmetry, resulting in wavelength selective scattering of light in a wide range of directions. The bio-inspired photonic fibers combine the spectral filtering  
(Continued)

capabilities and color brilliance of a planar Bragg stack compounded with a large angular scattering range introduced by the microscale curvature, which also decreases the strong directional chromaticity variation usually associated with flat multilayer reflectors. Transparent and elastic synthetic materials equip the multilayer interference fibers with high reflectance that is dynamically tuned by longitudinal mechanical strain. A two-fold elongation of the elastic fibers results in a shift of reflection peak center wavelength of over 200 nm.

34 Claims, 5 Drawing Sheets

(51) Int. Cl.
    *G01L 1/24*     (2006.01)
    *G02B 1/00*     (2006.01)
    *G02B 6/028*     (2006.01)
    *G02B 6/036*     (2006.01)

(52) U.S. Cl.
    CPC .......... *G02B 6/023* (2013.01); *G02B 6/02033* (2013.01); *G02B 6/02038* (2013.01); *G02B 6/0285* (2013.01); *G02B 6/02304* (2013.01); *G02B 6/02309* (2013.01); *G02B 6/03611* (2013.01)

(58) Field of Classification Search
    CPC .............. G02B 6/02309; G02B 6/0285; G02B 6/03611
    USPC .................................................. 385/13, 124
    See application file for complete search history.

(56) References Cited

U.S. PATENT DOCUMENTS

2005/0226579 A1   10/2005   Fink et al.
2007/0009217 A1    1/2007   Seifert
2007/0097108 A1*  5/2007   Brewer .................... G02B 6/06
                                                 345/204

OTHER PUBLICATIONS

Brown et al., "Photonic Crystal-Based Fibers," National Textile Center Annual Report, Project M02-CL06, Nov. 2005, 10 pages.

Gauvreau, B. et al., "Color-changing and color-tunable photonic bandgap fiber textiles," Optics Express, vol. 16, No. 20, pp. 15677-15693 (Sep. 29, 2008).

Gibbons, N., et al., "Scalable Cylindrical Metallodielectric Metamaterials," Advanced Materials, vol. 21, No. 38-39, pp. 3933-3936 (Jul. 20, 2009).

International Preliminary Report on Patentability and Written Opinion issued by the European Patent Office as International Searching Authority for International Application No. PCT/US2014/012807 dated Aug. 6, 2015 (9 pages).

International Search Report and Written Opinion dated May 13, 2014, in the International Application No. PCT/US2014/012807 filed Jan. 23, 2014, 13 pages.

Kolle, M., et al., "Bio-Inspired Band-Gap Tunable Elastic Optical Multilayer Fibers," Advanced Materials, vol. 25, pp. 2239-2245 (Jan. 27, 2013).

Kolle, M., et al., "Mimicking the colourful wing scale structure of the *Papilio blumei* butterfly," Nature Nanotechnology, vol. 5, pp. 511-515 (Jul. 2010).

* cited by examiner

BAND-GAP TUNABLE ELASTIC OPTICAL MULTILAYER FIBERS

RELATED APPLICATIONS

This application is a national stage application of International Application No. PCT/US14/12807 filed Jan. 23, 2014, which claims priority to U.S. Provisional Application No. 61/755,681 filed Jan. 23, 2013, the contents of which are incorporated by reference herein in their entireties.

STATEMENT REGARDING FEDERALLY SPONSORED RESEARCH OR DEVELOPMENT

The present invention was made with United States government support under Grant No. FA9550-09-1-0669-DOD35CAP, FA9550-10-1-0020 awarded by the United States Air Force. The United States government has certain rights in this invention.

INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD

This technology relates generally to the field of biophonics and biooptics. In particular, this invention relates to photonic fibers.

BACKGROUND

Knowledge of the interplay between the morphology, composition and optical appearance of biological photonic systems can provide broad inspiration for novel artificial photonic elements. Nature's most vivid colors, highest transparencies, strongest whites and deepest blacks rely on ordered, quasi-ordered or disordered structures with lattice constants or scattering element sizes on the order of the wavelength of visible radiation. By inducing interference or diffraction, biological photonic structures of a wide structural diversity strongly alter the spectral composition of reflected and transmitted light resulting in the stunning structural colors of many organisms. One-dimensional multilayer arrangements play an important role in the creation of structural colors in nature and have primarily been studied in the animal kingdom, especially the insect world. Planar layered photonic system have recently also been increasingly frequently reported in various plants.

The fruits of the plant *Margaritaria nobilis* in the rain forests of Middle and South America have a striking blue-green hue. The plant partly relies on seed dispersal by birds which might be attracted by the colorful display. The cells in the fruit's blue seed coat are elongated and mostly appear blue or green. Several layers of cells are stacked on top of each other with varying planar orientation of the individual cell layers. The interior volume is occupied by a periodic concentrically-layered morphology with an overall periodicity of (180±30) nm. Light incident on the fruit's surface undergoes interference within the periodic structure in each cell resulting in the reflection of blue light.

Under directional illumination a planar multilayer interference structure can only display its bright coloration in the specular reflection direction. The hue of such planar Bragg stacks strongly depends on the angle of incidence. Under diffuse illumination the observed color blue-shifts for increasing observation angle. By contrast, in *M. nobilis* fruits the superposition of a microscopic curvature on the nanoscale regularity of the layered structure within each individual seed coat tissue cell combined with the fruit's overall macroscopic curvature leads to an increased visibility of the reflected structural color across a wide angular range. Under directional illumination, a part of the curved multilayer in a majority of the individual cells is oriented to satisfy the specular reflection condition providing a spatially varying pixelated sparkle of different hues that depend on the locally varying angle of light incidence. In diffuse light this sparkle is suppressed as the light reflected by each fruit cell towards the observer originates from light incident on the fruit from various directions, producing a more isotropic color that only gradually changes across the fruit due to the macroscopic curvature.

The emergence of unique structural and optical properties from combinations of structures on different length scales within hierarchical synergistic assemblies is a principle often encountered when studying natural systems. Increasingly frequently this concept is also applied in novel optical technologies. The hierarchical photonic architecture in the seed coat of the *M. nobilis* fruit is the key element involved in the creation of intense blue and green hues. It provides inspiration for the manufacture of artificial photonic fibers with the optical functionality being defined by the interplay of nanoscopic regularity and superimposed microscopic curvature.

Optical fiber systems with multilayer claddings have theoretically been discussed since the late 70's and have more recently been manufactured using standard fiber drawing processes from macroscopic preforms. The choice of materials that can be drawn into multilayer fibers is constrained to a limited, albeit continuously expanding set of components. In particular, the preform material combinations need to provide an appropriate refractive index contrast and have matching thermal expansion coefficients in order to prevent fracturing at the material interfaces during the processing at elevated temperature.

Planar flexible multilayer systems using soft organic materials has been reported. The planar sheets were used for the creation of multilayer claddings on rods with macroscopic diameter to facilitate the manufacture of microscopically planar multilayer stacks.

SUMMARY

Tunable band-gap multilayer fibers with a large tuning range in the visible spectrum are provided.

In one aspect, concentric multilayer-wrapped fibers with a radially periodic refractive index profile built from only two alternating phases is described. While similar to its natural model (the fruit of *M. nobilis*) in dimensions and underlying optical interactions, the multilayer-wrapped fiber system avoids many of the complexities in the natural structure including the ellipticity of the fruit cells' cross-section and any existing fine structure within the periodic layers. The multilayer-wrapped fibers are bandgap tunable and the peak reflection wavelength can be varied. Furthermore, the structural color of the photonic fibers can be observed across a wide angular range, as compared to the angle-dependent color typically observed in planar interference structures.

In one aspect, a tunable band-gap multilayer fiber includes a central core extending along the length of the fiber, wherein the central core has a diameter in the range of 10 μm to 500 μm; a first polymer layer having a first refractive index; a second layer having a second refractive index, wherein the first and second polymer layers are positioned adjacent to one another to form a bilayer and wherein the first and second refractive indices are selected to provide interference of light reflected from the optical interfaces between layers; wherein the bilayer is concentrically wound around the central core to provide a multilayer cladding.

In one or more embodiments, the second layer includes a polymer, or the second layer includes a metal.

In any preceding embodiment, the central core includes a glass fiber, or the central core comprises a polymer fiber, or the central core comprises an elastomer fiber.

In any preceding embodiment, the polymer fiber is capable of being reversibly stretched and/or laterally compressed.

In any preceding embodiment, the central core is hollow, or the central core is a space defining an open central axis.

In any preceding embodiment, the first and second layers include an elastomer, or the first and second layers are capable of being reversibly stretched and/or laterally compressed.

In any preceding embodiment, the first and second layer have a layer thickness in the range of 50-300 nm and/or. the multilayer cladding has 10-200 bilayer windings.

In any preceding embodiment, the periodicity of the wound bilayers is the same, or the photonic fiber comprises regions of wound bilayers having different periodicities, or the photonic fiber comprises regions of wound bilayers having a controlled gradient in periodicity.

In any preceding embodiment, the photonic fiber further includes a third layer positioned adjacent to the bilayer to form a trilayer, and optionally, the third layer is a metal layer.

In any preceding embodiment, further includes a patterning or axial variation/axial symmetry breaking imposed by a one or several micron-sized objects or a patterns on the initial bilayer/trilayer incorporated in the cladding during rolling.

In any preceding embodiment, the fiber is expandable to up to 200% of its length.

In another aspect, a method of making a tunable band-gap multilayer fiber includes
(a) providing:
  (i) a central core extending along the length of the fiber, wherein the central core has a diameter in the range of 10 μm to 500 μm;
  (ii) a first polymer layer having a first refractive index; and
  (iii) a second layer having a second refractive index, wherein the first and second layers are positioned adjacent to one another to form a bilayer and wherein the first and second refractive indices are selected to provide interference of light reflected from the optical interfaces between layers; and
(b) positioning the central core on the bilayer; and
(c) winding the bilayer concentrically around the central core to form a multilayer cladding.

In one or more embodiments, the central core is positioned at an edge of the bilayer and the wound bilayer has a uniform periodicity.

In any of the preceding embodiments, the central core is positioned at a location offset from an edge of the bilayer, and the wound bilayer has wound layers of different periodicity.

In any of the preceding embodiments, the bilayer is extended for at least a portion of its length during winding, wherein the thickness of the wound layers is varied to obtain a controlled gradient in thickness.

In any of the preceding embodiments, the method further includes removing the central core after winding.

In any of the preceding embodiments the central core includes a glass fiber, or the central core comprises a polymer fiber core.

In any of the preceding embodiments, the multilayer fiber includes an elastomer in the core, and/or the polymer fiber core is capable of being reversibly stretched and/or laterally compressed.

In any of the preceding embodiments, the first and second layers include an elastomer or the first and second layers are capable of being reversibly stretched and/or laterally compressed.

In any of the preceding embodiments, the first and second layer have a layer thickness in the range of 50 nm-300 nm, and/or the wound bilayer comprises 10-200 windings.

In any of the preceding embodiments, the periodicity of the wound bilayers is the same.

In any of the preceding embodiments, the second layer is a metal layer.

In any of the preceding embodiments, the method further includes providing a third layer positioned adjacent to the bilayer to form a trilayer, and optionally, the third layer is a metal layer.

In another aspect, a method of tuning the optical response of a tunable band-gap multilayer fiber includes providing a tunable band-gap multilayer fiber as described herein; and applying a strain to the fiber, wherein the fiber exhibits a shift in the reflection spectrum.

In one aspect, a strain stress and/or sensor is provided including the tunable band-gap multilayer fiber according as described herein.

In one or more embodiments, the sensor is capable of detecting a compressive force, or. the sensor is capable of detecting a tensile force.

In one or more embodiments, the sensor is incorporated into one or more of a compression bandage and suture.

The bio-inspired design and manufacture of this form of soft photonic fiber heralds the transition to novel fiber-based flexible photonic materials and textiles with colors that are tunable over the entire visible spectrum and optical strain sensors.

These and other aspects and embodiments of the disclosure are illustrated and described below.

BRIEF DESCRIPTION OF THE DRAWINGS

The invention is described with reference to the following figures, which are presented for the purpose of illustration only and are not intended to be limiting.

In the Drawings:

FIG. 1A is a schematic representation of fabrication of a photonic fiber according to one or more embodiments.

FIGS. 1B-1D are optical micrographs of three rolled-up multilayer fibers with different layer thicknesses and colors in reflection (top) and transmission (bottom).

FIG. 1E is a scanning electron micrograph of a fiber cross-section for the fiber shown in FIG. 1C along the dashed line, showing the multilayer cladding wrapped around the fiber's glass core.

FIG. 1F is a scanning electron micrograph of the individual layers in the cladding; scale bars for FIGS. 1A-1F are (B-D) 20 μm, (E) 20 μm and (F) 1 μm.

DETAILED DESCRIPTION

In one aspect, a room temperature fiber rolling technique is described that allows fabrication of multilayer fibers with hundreds of layers from a wide range of polymeric material combinations that would not be realizable by conventional thermal fiber drawing. The fibers' band-gap center frequency can be tuned by adjusting the individual film thicknesses of the two constituent layers prior to the rolling process, which allows shifting of the fibers' tuning range within the visible range and into the near UV or near IR. The optical properties of the rolled photonic fiber can be further modified during the rolling process to allow changes in the periodicity of the windings. Chirped multilayer fibers can be realized by applying an appropriate force on the elastic bilayer during rolling of the multilayer cladding. Internal structures that break axial symmetry are created by incorporating microscopic objects or micro- to nano-scale patterns in or on the bilayer prior to rolling of the fibers.

In one aspect, micron-scale multilayer-wrapped fibers are fabricated at room temperature from a wide range of soft organic and also inorganic materials with varying optical and mechanical properties that are not restricted to a translational symmetry along the fiber axis as in thermally drawn fibers. In exemplary embodiments, the fibers comprise two elastomeric dielectrics, polydimethylsiloxane (PDMS) and polyisoprene-polystyrene triblock copolymer (PSPI), two inexpensive materials that are commercially available in industrial quantities and provide a sufficiently high refractive index contrast ($n_{PDMS}$=1.41±0.02, $n_{PSPI}$=1.54±0.02, determined by ellipsometry). Multilayer fibers are produced by initially forming a bilayer of the two constituent materials, which is subsequently rolled up onto a thin glass fiber, polymer fiber or elastomer diameters ranging from 10 μm to 500 μm) to form the multilayer cladding. Refractive index differences as small as 0.01 between the fiber materials can induce the multilayer interference necessary for the photonic effect described herein to occur, provided the number of layers in the cladding is scaled accordingly. The smaller the refractive index contrast, the higher the number of layers required to induce a pronounced effect. Larger refractive index contrasts of the constituent materials provide fibers with wider band-gaps. In exemplary embodiments, the difference in the refractive index is greater than 0.01, or greater than 0.05, or greater than 0.1, or greater than 0.15, or greater than 0.2, or greater than 0.25. In other embodiments, the difference in the refractive index is between 0.01 and 1.0, or between 0.05 and 0.5 or between 0.1 and 0.25. Any combination of these ranges is contemplated as suitable ranges for the generation of appropriate interference effects resulting from light reflection of the optical interfaces between the layers. Effective refractive index differences can in general result from a difference in the real part of the refractive index or alternatively a different in the imaginary part, which describes the absorption strength of a material. In some embodiments, the refractive interference difference can be higher than 1.0, for example combinations of Teflon components (for instance Teflon AF) and metal oxides (for instance titanium oxide).

Fabrication of a photonic multilayer-wrapped fiber is shown in FIG. 1A. The polymer layers can be selected for optical properties, e.g., the two layers can have a high refractive index contrast, and mechanical properties, e.g., the polymer layers are elastic or can be stretched and retracted. A first polymer layer is generated by casting a solution of the appropriate polymer or polymer precursor onto a substrate. In one or more embodiments, the layer is cast using a spin coater, however, other methods for casting films can be used. Spray coating or blade coating, two industrially well-established techniques that are compatible with roll-to-roll processing, are viable alternatives for the bilayer production on a larger scale. The fiber cladding can be formed from a polymer bilayer but can also be made by rolling up a trilayer or a stack of any multiple of different thin films.

Any organic material with a desirable dielectric or mechanical property that can be processed with the techniques outlined above is suitable for use in the rolled photonic fibers described herein. Non-limiting examples include polystyrene, poly(methyl methacrylate), polyisoprene, polystyrene-polyisoprene block co-polymers, polydimethylsiloxane, polybutadiene and various photoresists.

In one or more embodiments, the soft organic material is an elastomer, for instance polyisoprene-polystyrene block co-polymers, polyisoprene, or polydimethylsiloxane. Other dielectric materials can be used in the fiber manufacture including thermoplastics, for instance polystyrene and poly (methyl methacrylate).

In one or more embodiments, thin metal films can be incorporated into the bilayer. Such metal layers can be included as an additional layer, e.g., forming a trilayer structure for winding, or can be used as one of the two layers that form the photonic structure.

In one exemplary system, polydimethylsiloxane (PDMS) is dissolved in heptane and spun onto a silicon substrate. A sacrificial water soluble layer can be first deposited on the silicon substrate to assist release of the layer during the rolling step. Annealing in an oven at 120° C. for one hour leads to crosslinking of the PDMS which makes it resistant to toluene, the solvent used for the polyisoprene-polystyrene triblock (PSPI) copolymer. Annealing can happen at a variety of temperatures under varying conditions. PSPI copolymer is subsequently spun onto the PDMS layer. The resulting layer thicknesses can be optimized to maximize the distributed Bragg reflector (DBR) reflectivity in any desired part of the visible spectrum. This is done following the Bragg relation for ideal multilayers (at normal light incidence) $d_i=\lambda_c/(4n_i)$ that provides the optimum thickness of layer i for a given material with refractive index $n_i$ for a desired reflection band center wavelength $\lambda_c$. In this particular example, the micro-phase separation of the polystyrene component in the PSPI copolymer leads to nanoscopic glassy minority domains in a polyisoprene matrix, which act as cross-links, rendering the curing of the polyisoprene rubber unnecessary. The optical properties of this material system provide for the controlled reversible tuning of the fiber's optical performance, which is demonstrated below.

The fiber rolling technique can produce concentric multilayers on core fibers of only ~10 μm diameter using elastic materials. Fibers have been rolled on cores with diameters as small as 10 μm up to 500 μm. Such multilayer fibers with curvature on the microscale display optical properties that are distinctly different from materials produced on macroscopic rolls, whose radius of curvature more closely mimics planar structures. It has been determined that rolled fibers having a fiber core greater than 1 mm tend to have properties that are consistent with planar photonic devices. To form the rolled photonic fiber, strips of the bilayer are released from the substrate and positioned floating on the surface of a water bath. This can be accomplished by slow lowering the supported bilayer into a water bath, as shown in FIG. 1B, or by raising the water level up to the bilayer for it to be released from the substrate. The sacrificial water layer dissolves to detach the bilayer from the substrate. A thin fiber, which will form the core of the final photonic fiber is lowered on to the upper surface of the floating bilayer. Once contacted to the surface, it adheres sufficiently strongly to permit the bilayer films to be rolled into a fiber having a 'jelly-roll' structure. The 'jelly roll' structure can be defined by a number of characteristics. The wound fiber will have a number of 'layers' or 'windings', each layer or winding being a length of the bilayer that makes one circumvention of the axis. The layers or windings also demonstrate a periodicity, which is defined by the thickness of the bilayer as is wraps around the central axis. The thicknesses of the windings are uniform along the length of the bilayer (and hence across the radial dimension of the rolled fiber), the periodicity is uniform. The thicknesses of the windings vary along the length of the bilayer (and hence across the radial dimension of the rolled fiber), the periodicity is non-uniform or there can be regions of different periodicities.

The individual thicknesses of the two films in the initial bilayer can be tuned during the film deposition. Consequently, the spectral position of the reflection band of the fibers can be freely adjusted. In addition, while a bilayer is described, it is contemplated that three or more layers of different dielectric properties may be used to provide a more complex photonic response. Three fibers with high reflectivity in different color ranges of blue, green and red, respectively, and the corresponding complementary color in transmission are shown in FIGS. 1B-1D. The thicknesses for each individual constituent layer are smallest for the blue fiber (~75 nm), larger for the green one (~90 nm) and larger yet for the red one (~105 nm). In all three fibers the cladding consists of around 80 bilayer windings and fibers of up to 150 bilayer windings have been produced. Scanning electron micrograph images of the cross-section of a green fiber from FIG. 1C visualize the concentric multilayer cladding with 80 periods wrapped around the core glass fiber (FIGS. 1E and 1F).

Figure 2:
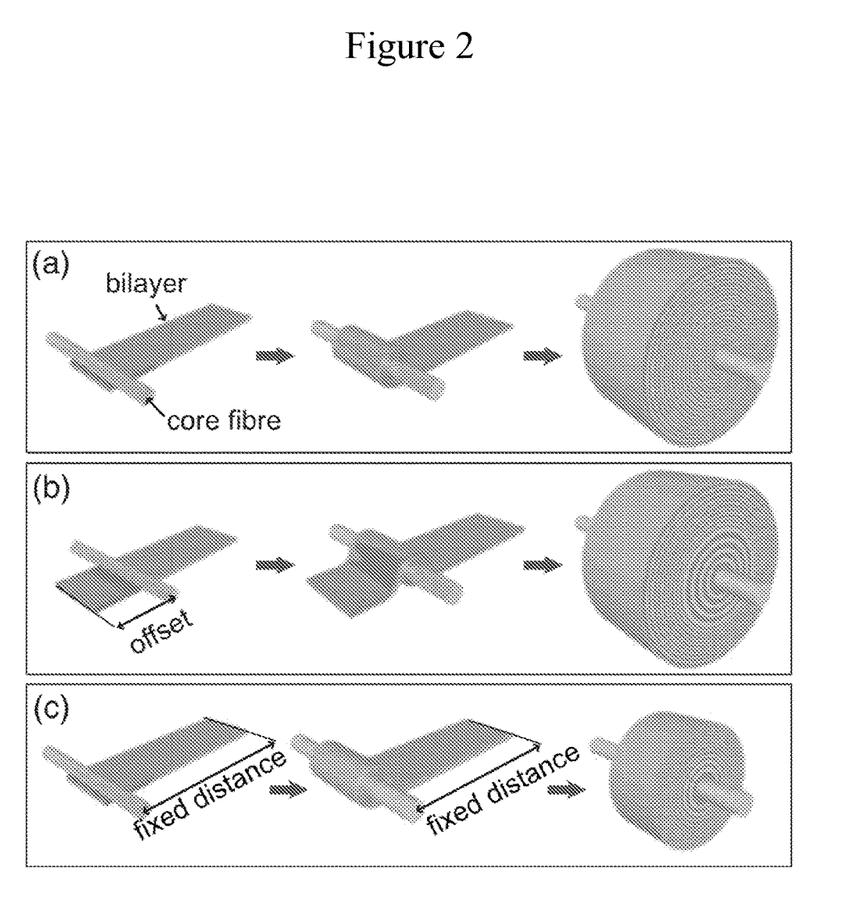
FIG. 2 is a schematic illustration showing rolled photonic fibers having different fiber-internal geometries using modifications of the manufacturing procedure to provide (a) rolling of fibers with a single periodicity, (b) realization of fibers with two internal periodicities; (c) rolling of fibers with gradual thickness variation according to various embodiments.

In addition, small modifications in the process of rolling the multilayer cladding onto the core fiber permit the realization of different internal geometries in the fiber. Attachment of the core fiber at the end of a free floating bilayer results in a fiber with one periodicity throughout the whole cladding. FIG. 2A illustrates this rolling protocol and the side view of the rolled fiber (not drawn to scale) shows the uniform periodicity of the photonic fiber.

In another embodiment, claddings with two distinct multilayer periodicities can be realized. FIG. 2B illustrates a method of preparing a rolled photonic fiber by attaching the core fiber a certain offset distance away from the edge of the bilayer film. In this case, the inner section of the multilayer cladding has twice the periodicity of the outer section and the ratio of layer numbers in the inner and outer section can be controlled by controlling the distance between bilayer edge and fiber attachment line.

In another embodiment, the periodicity of the rolled photonic fiber can vary across the diameter. Chirped multilayer claddings with a gradient in periodicity are realized by fixing the distance between the core fiber and the far edge of the bilayer during rolling leading to a successive stretching of the bilayer and a corresponding thinning of the rolled-up layers. As expected, such chirped multilayer fibers have a silvery appearance due to a wide reflection band. FIG. 2C illustrates a method of introducing varying periodicity into the rolled photonic fiber by stretching or relaxing the bilayer strip during rolling.

In another embodiment, the internal structure of the photonic fiber can be modified by incorporating micro-scale elements, such as fibers or colloidal particles, or patterns obtained by nano-embossing or photolithography onto the initial bilayer (or multilayer) film that is rolled onto the core fiber. For example, patterns can be introduced into the fiber by inclusion of a fiber element while assembling the photonic fiber, which breaks the axial symmetry of the rolled fibers.

In one or more embodiments, the glass fiber that can act as the substrate for the multilayers in the rolling process can be removed from the fiber, for example, by dissolution in hydrofluoric acid or by simply pulling it out of the multilayer cladding. Once the glass core is removed, the fiber, remaining multilayered being composed of two elastomers, can be elastically deformed by stretching it along its axis. In one or more embodiments, the fiber that acts as the substrate for the multilayers in the rolling process can be made of a stretchable polymer, such as PDMS. In this way, the resulting rolled photonic fiber can be elastically deformed by stretching it along its axis. An elongation along the fiber axis leads to a compression perpendicular to it, causing a decrease of its overall diameter and a reduction of the thickness of each individual layer. Due to the comparable Poisson's ratio of the constituent elastic materials the thickness ratio and the reflection intensity remain constant while the reflection band blue-shifts. This way, the reflected and transmitted color can be reversibly tuned by axial extension of the fibers.

The core fiber can be produced from elastomeric, absorbing materials (such as PDMS-carbon nanoparticle composites) to provide strong absorption in the fiber core, which suppresses transmitted colors and thereby purifies the reflected colors. This gives the fibers a superior color brilliance especially in environments with multiple light sources and light reflecting surfaces that result in complex illumination environments.

The incorporation of gold or silver layers into the concentric multilayer offers potential for the development of novel micron-scale fiber-based meta-materials. Asymmetric structures or chirality could be incorporated into the fibers by patterning of the initial bilayer prior to the rolling, promising additional interesting optical properties. Removal of glass fiber core from inside the multilayer cladding or rolling of the cladding on elastic core fiber permits mechanical deformation of fibers to more than twice their original length, which causes a tuning of the band-gap and a spectral blue-shift of over 200 nm. In one or more embodiments, the rolled photonic fiber incorporates a flexible core fibers. The flexibility in the choice of constituent materials for the multilayer fibers and their unique combination of mechanical and optical properties holds great potential for applications in mechanically tunable light guides or optical strain sensing. The fibers' mechanical flexibility and elasticity, in addition to the demonstrated color brilliance and tunability, can make them a versatile novel material for smart, color-dynamic textiles. The reported multilayer fiber manufacturing process can in principle be applied to a wide range of synthetic materials with varying optical and mechanical properties. Large area deposition of the initial bilayer can be achieved by spraying or blade coating in a roll-to-roll process before final rolling of the multilayer fibers. Hollow photonic fibers providing good thermal insulation can be produced by employing hollow polymeric micro-tubing as the inner fiber core. Exposure of the fibers to different solvents in the vapor or liquid phase would result in varying degrees of swelling and a corresponding reflection peak red-shift endowing the fibers or textiles made thereof with optical solvent sensing capacities. The final formation of the multilayer rolls could in principle also be achieved by self-induced rolling of the bilayer caused by directional stresses, which can be induced by gradually swelling one of the bilayer phases selectively.

Figure 3:
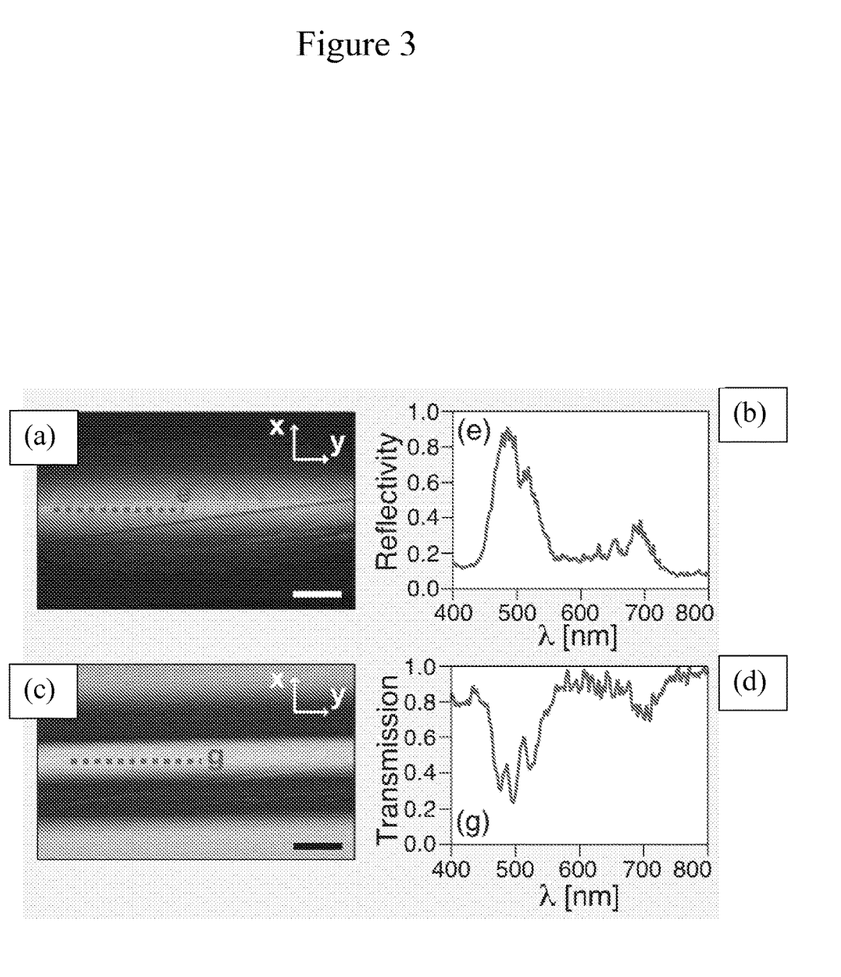
FIG. 3A is an optical micrograph of a blue fiber in reflection.
FIG. 3B is the corresponding reflection spectrum averaged along the dashed line in FIG. 3A.
FIG. 3C is an optical micrograph of a blue fiber in transmission.
FIG. 3D is the corresponding reflection spectrum averaged along the dashed line in FIG. 3C; all scale bars—20 μm.

Fibers prepared according to one or more embodiments show a pronounced reflection in a finite wavelength range imposed by the multilayer periodicity of the multilayer windings and a corresponding drop in transmission. FIG. 3A is an optical photomicrograph of a fiber (having layer thicknesses of ~75 nm, around 80 layers) in reflection mode showing blue color and FIG. 3B is its reflectivity spectrum showing up to 90% reflection in the blue region of the visible spectrum. FIG. 3C is an optical photomicrograph the same fiber in transmission mode, and FIG. 3D is its transmissivity spectrum showing a corresponding dip in the blue region of the visible spectrum. It has been observed that fibers rolled with multilayer claddings of up to 150 periods provide a reflectivity of more than 90% in their reflection band and a bandwidth varying from 70 nm to 30 nm, decreasing with increasing number of layers in the cladding.

Figure 4:
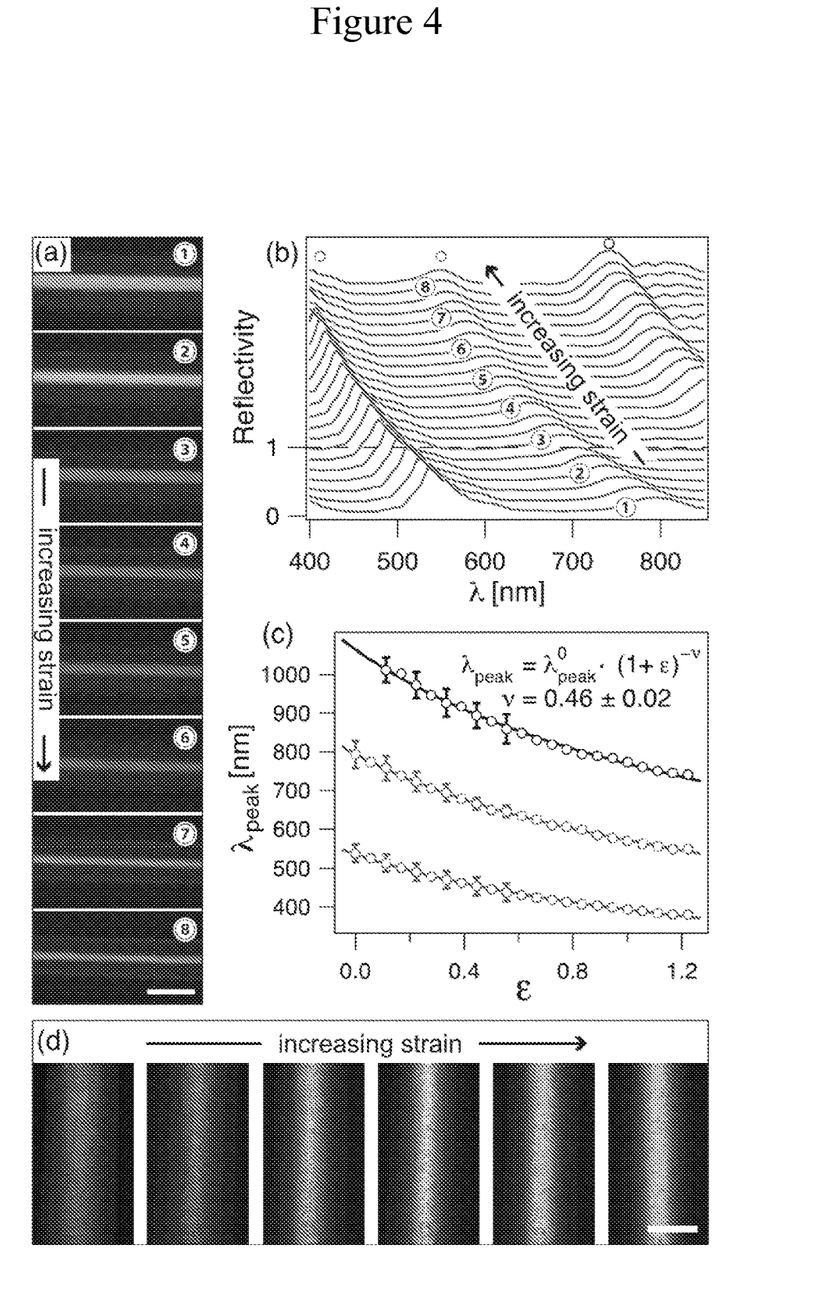
FIG. 4 demonstrates the mechanical tuning of the fibers' optical performance and shows (a) optical micrographs of a fully elastic fiber showing the color tuning upon mechanical deformation induced by elongation along the fiber axis (scale bar 50 μm); (b) the variation in the reflection spectrum corresponding to the applied deformation; (c) variation of peak wavelength $\lambda_{peak}$ with applied strain & in which the open circles of different color correspond to three observed reflection peaks (labeled in (b) with corresponding open circles); (d) color tuning of a second fiber with different layer thickness where the glass core was removed by a hydrofluoric acid etch (scale bar 50 μm).
Figure 5:
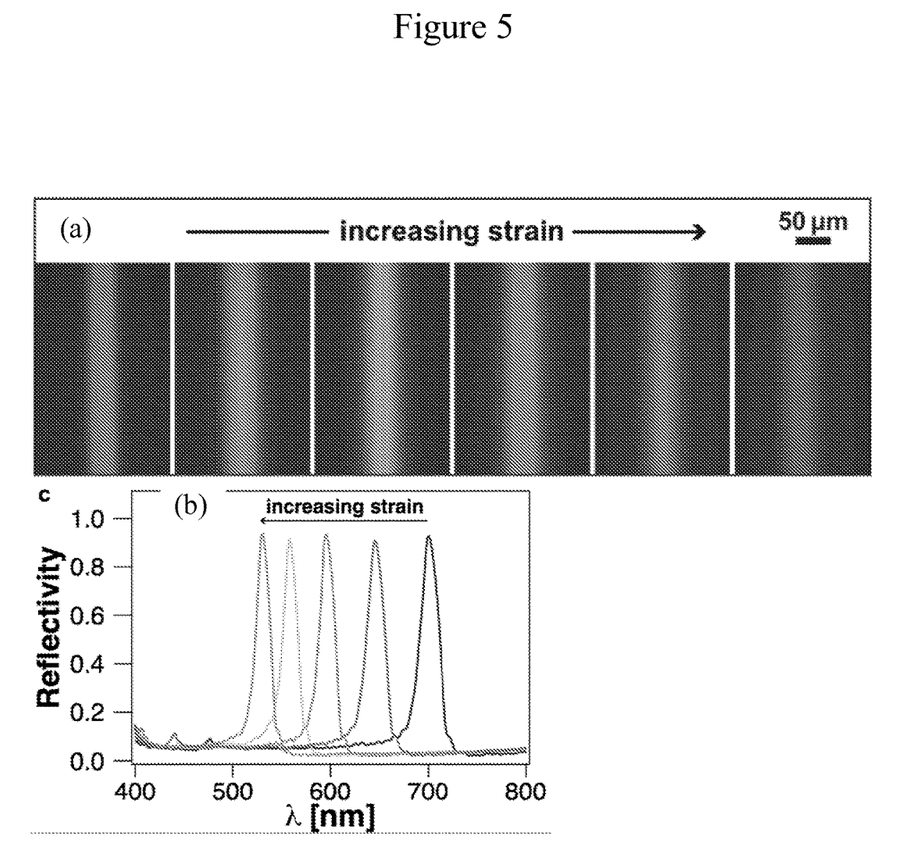
FIG. 5 shows (a) optical micrographs of a fully elastic fiber showing the color tuning upon mechanical deformation induced by elongation along the fiber axis (scale bar 50 μm); and (b) a plot of reflectivity vs. wavelength demonstrating the shift in reflected light with increasing strain.

In one or more embodiments, the optical performance of the photonic fibers can be tuned by mechanical deformation. Due to the comparable Poisson's ratio of the constituent elastic materials used in the rolled photonic fibers, the thickness ratio and the reflection intensity remain constant while the reflection band blue-shifts. This way, the reflected and transmitted color can be reversibly tuned by axial extension of the fibers FIG. 4A shows optical micrographs of a fully elastic fiber showing the color tuning upon mechanical deformation induced by elongation along the fiber axis. In this fiber, the stiff glass core was removed from the fiber by pullout before stretching. The observed color transitions from green to blue through the visual color spectrum with increasing strain. The corresponding variation in the reflection spectrum is shown in FIG. 4B, with like numbering referring to similarly numbered optical photograph in FIG. 4A. The bottom spectrum is shown on absolute scale (this particular fiber showed a peak reflectivity of over 70%) and subsequent spectra are offset from the previous one by 0.15. FIG. 4D shows the color tuning of a second fiber with different layer thickness where the glass core was removed by a hydrofluoric acid etch. The fiber color can be tuned throughout the whole visible spectrum. The variation of peak wavelength $\lambda_{peak}$ with applied strain ε is reported in FIG. 4C. The open circles of different color correspond to three observed reflection peaks (labeled in 4B with corresponding open circles). The lines represent fits based on a power law that results from considering the fiber to be isotropically elastic, with the fit parameter ν representing the fiber's Poisson's ratio. The error bars shown for a selection of data points correspond to the standard deviation of the peak positions obtained for five consecutive stretch runs at different positions along the fiber. A reversible peak wavelength shift of over 200 nm has been recorded for axial elongations of a fiber to over 200% of its original length (See, FIGS. 4B and 4C). In a different fiber with an elastic core, the tuning from red to blue color is obtained without removing the core (FIG. 5A). The reflectivity in this fiber amounts to over 95% and is conserved upon tuning of the fiber reflection color (FIG. 5B).

From Poisson's ratio and the proportionality between the thickness of individual layers in the cladding and the spectral band-gap position, the reflection peak center wavelength $\lambda_{Peak}$ is predicted follow the relation $\lambda_{peak}=\lambda_{peak}^{0}(1+\varepsilon)^{-\nu}$, where $\lambda_{peak}^{0}$ represents the reflection peak centre wavelength at zero axial strain, ε the applied axial strain and ν the fibre's Poisson's ratio. Fitting the experimental data with this relation yields a Poisson's ratio of ν=0.46±0.02 for the stretchable multilayer fibers matching the Poisson's ratios of the constituent rubber materials (FIG. 4C).

In one or more embodiments, stress/strain sensors based on photonic fibers are contemplated. The tunable photonic fibers can be used in applications where it is desirable to have information regarding stress, strain and/or compression, or sensing of compressive or tensional compressive strains In a device for compressive stress/strain sensing the fibers are oriented perpendicularly to the direction of acting stresses and resulting strains, which leads to a compression of the layers in the fiber cladding resulting in a variation of color to shorter wavelengths (blue-shift). In tensile stress and strain sensing applications the fibers are aligned with the direction of stress and strain. A longitudinal expansion will result in a lateral compression of the layers in the cladding, leading to a color variation from higher to lower wavelengths. Light levels necessary for obtaining visual information about mechanical forces from such mechano-responsive optical fiber sensors can originate from environmental light (in well and homogeneously lit environments) but also can be imposed by an internal light source (for instance LEDs). Qualitative read-out can be based on a visual assessment with the human eye or suitable imaging devices, while quantitative read-outs are achieved with appropriately calibrated photodiodes or CCD arrays.

In one aspect, the photonic fibers can be incorporated into threads used as sutures. Small sections of photonic fibers can be spliced into conventional suturing filaments. Fibers can be co-wound around suturing filaments. Alternatively, the fibers can be the suturing filaments. The resultant stress/strain-sensitive sutures can provide information regarding the strain applied to the suture, for example, during suturing operations. This information can be useful, for example, for suturing operations in robotic surgery, providing information about the amount of stress and strain exerted on the filament by the robotic tool that performs the suture and also providing information about the forces exerted by the suture on the bonded biological tissue.

In other embodiments, the stress/strain sensors based on photonic fibers can be used for the structural health monitoring of buildings, bridges or other infrastructure.

In other aspects, the photonic fibers can be incorporated into devices that provide a visual indicator of compressive forces. Pressure sensors can incorporate photonic fibers that are capable of registering a pressure/compression via a color change resulting from lateral compression of the layers. In one embodiment, the photonic fibers can be incorporated into compression bandages. Application of the fibers in compression bandages can give medical staff a direct visual read-out for the force and amount of compression employed by the bandage. In other embodiments, the photonic fibers can function as solvent sensors. The photonic fibers can be made of polymers that swell in the presence of specific solvents. The swelling of fibers in solvent vapor atmosphere will generate compressive forces on the fiber that lead to a predictable change in color.

The invention is illustrated in the following examples, which are presented for the purpose of illustration only and are not intended to be limiting of the invention.

Experimental Section

Fiber Manufacture

A thin polydimethylsiloxane (PDMS, Sylgard 184, Dow Corning) film was spun from a 4% wt solution in heptane onto a sacrificial water-soluble polystyrene-sulfonic acid layer on a silicon wafer. The PDMS film was cross-linked by curing it on a hotplate for 2 h at 70° C. Subsequently, a bilayer was formed by spin-coating a polystyrene-polyisoprene-polystyrene triblock copolymer (PSPI, Sigma Aldrich, 14% wt content polystyrene) film on top of the cross-linked PDMS layer from a 4% wt solution in toluene. The bilayer was then released from the wafer onto the surface of a water bath. This was achieved by immersing the sample slowly into the water at an angle varying between 30-45° allowing the water to dissolve the sacrificial water-soluble film between the elastomer bilayer and the substrate, thereby detaching the bilayer from the substrate. A thin glass, polymer or elastomer fiber was then lowered onto the end of the floating bilayer, where it adhered to the PSPI film, the top layer in the bilayer. Once the core glass fiber had attached it was rotated at a speed of 10-20 turns per minute rolling up the bilayer to form the multilayer cladding.

Structural and Optical Analysis

Images were obtained by scanning electron microscopy (Hitachi S-3200N SEM). For imaging, the samples were coated with a 3 nm thick film of a gold/palladium alloy. Cross-sections of the fibers were obtained by cryo-fracture. Fractured fibers were coated with a 3-5 nm thick platinum film to avoid charging artifacts during imaging and visualized using a field emission scanning electron microscope (Zeiss Supra55VP).

Simultaneous imaging and micro-spectroscopic spatial reflection/transmission intensity mapping of the fibers was performed in a modified optical microscope. The samples were illuminated in the area of interest with a halogen lamp in reflection or transmission. Via an additional microscope port, a fraction of the reflected light was collected confocally and guided by a fiber to a spectrometer. The detection spot size depends on the diameter of the fiber and the magnification of the objective lens. Measurements with a 50× objective (NA=0.55) and a fiber with 50 µm core diameter resulted in a spatial resolution of 1 µm. All spectra are referenced against a flat silver mirror of ≥95% reflectance in the wavelength range of 400-800 nm. In order to acquire spatially and spectrally resolved intensity distributions of a specific area on a sample, the sample was translated stepwise in the focal plane of the microscope with a minimum step size of 1 µm using an automated, remote-controlled stage. Individual spectra were acquired after each scanning step resulting in a complete map of the spectrally-resolved intensity distribution of the samples in reflection or transmission.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

What is claimed is:

1. A tunable band-gap multilayer fiber, comprising:
   a central core extending along the length of the fiber, wherein the central core has a diameter in the range of 10 µm to 500 µm;
   a first polymer layer having a first refractive index; and
   a second layer having a second refractive index, wherein the first and second polymer layers are positioned adjacent to one another to form a bilayer and wherein the first and second refractive indices are selected to provide interference of light reflected from the optical interfaces between layers;
   wherein the bilayer is concentrically wound around the central core to provide a multilayer cladding having a jelly roll structure, wherein the tunable band-gap multilayer fiber is reversibly expandable to 200% of its length.

2. The tunable band-gap multilayer fiber of claim 1, wherein the second layer comprises a polymer.

3. The tunable band-gap multilayer fiber of claim 1, wherein the second layer comprises a metal.

4. The tunable band-gap multilayer fiber of claim 1, wherein the central core comprises a glass fiber.

5. The tunable band-gap multilayer fiber of claim 1, wherein the central core comprises a polymer fiber.

6. The tunable band-gap multilayer fiber of claim 5, wherein the central core comprises an elastomer fiber.

7. The tunable band-gap multilayer fiber of claim 5, wherein the polymer fiber is capable of being reversibly stretched and/or laterally compressed.

8. The tunable band-gap multilayer fiber of claim 1, wherein the central core is hollow.

9. The tunable band-gap multilayer fiber of claim 1, wherein the central core is a space defining an open central axis.

10. The tunable band-gap multilayer fiber of claim 1, wherein the first and second layers comprise an elastomer, or the first and second layers are capable of being reversibly stretched and/or laterally compressed.

11. The tunable band-gap multilayer fiber of claim 1, wherein the first and second layer have a layer thickness in the range of 50-300 nm.

12. The tunable band-gap multilayer fiber of claim 1, wherein the multilayer cladding comprises 10-200 bilayer windings.

13. The tunable band-gap multilayer fiber of claim 1, wherein the periodicity of the wound bilayers is the same.

14. The tunable band-gap multilayer fiber of claim 1, wherein the fiber comprises regions of wound bilayers having different periodicities.

15. The tunable band-gap multilayer fiber of claim 1, wherein the fiber comprises regions of wound bilayers having a controlled gradient in periodicity.

16. The tunable band-gap multilayer fiber of claim 1, further comprising a third layer positioned adjacent to the bilayer to form a trilayer.

17. The tunable band-gap multilayer fiber of claim 16, wherein the third layer is a metal layer.

18. The tunable band-gap multilayer fiber of claim 1, further comprising a patterning or axial variation/axial symmetry breaking imposed by a one or several micron-sized objects or patterns on the initial bilayer/trilayer incorporated in the cladding during rolling.

19. A method of making a tunable band-gap multilayer fiber, comprising:
  (a) providing:
    (i) a central core extending along the length of the fiber, wherein the central core has a diameter in the range of 10 µm to 500 µm;
    (ii) a first polymer layer having a first refractive index; and
    (iii) a second layer having a second refractive index, wherein the first and second layers are positioned adjacent to one another to form a bilayer and wherein the first and second refractive indices are selected to provide interference of light reflected from the optical interfaces between layers, wherein the tunable band-gap multilayer fiber is reversibly expandable to 200% of its length;
  (b) positioning the central core on the bilayer; and
  (c) winding the bilayer concentrically around the central core to form a multilayer cladding.

20. The method of claim 19, wherein the central core is positioned at an edge of the bilayer and the wound bilayer has a uniform periodicity.

21. The method of claim 19, wherein the central core is positioned at a location offset from an edge of the bilayer, and the wound bilayer has wound layers of different periodicity.

22. The method of claim 19, wherein the bilayer is extended for at least a portion of its length during winding, wherein the thickness of the wound layers is varied to obtain a controlled gradient in thickness.

23. The method of claim 19, further comprising removing the central core after winding.

24. The method of claim 19, wherein the central core comprises a glass fiber.

25. The method of claim 19, wherein the central core comprises a polymer fiber core.

26. The method of claim 25, wherein the multilayer fiber comprises an elastomer in the core, and/or the polymer fiber core is capable of being reversibly stretched and/or laterally compressed.

27. The method of claim 19, wherein the first and second layers comprise an elastomer or the first and second layers are capable of being reversibly stretched and/or laterally compressed.

28. The method of claim 19, wherein the first and second layer have a layer thickness in the range of 50 nm-300 nm.

29. The method of claim 19, wherein the wound bilayer comprises 10-200 windings.

30. The method according to claim 19, wherein the periodicity of the wound bilayers is the same.

31. The method according to claim 19, wherein the second layer is a metal layer.

32. The method according to claim 19, further comprising providing a third layer positioned adjacent to the bilayer to form a trilayer.

33. The method of claim 32, wherein the third layer is a metal layer.

34. A tunable band-gap multilayer fiber, comprising:
  a central core extending along the length of the fiber, wherein the central core has a diameter in the range of 10 µm to 500 µm;
  a first polymer layer having a first refractive index; and
  a second layer having a second refractive index, wherein the first and second polymer layers are positioned adjacent to one another to form a bilayer and wherein the first and second refractive indices are selected to provide interference of light reflected from the optical interfaces between layers;
  wherein the bilayer is concentrically wound around the central core to provide a multilayer cladding having a jelly roll structure, wherein at least one of the first layer and the second layer comprises an elastomer and the tunable band-gap multilayer fiber is reversibly expandable to 200% of its length.

* * * * *